US012643155B2

(12) United States Patent
Suzuki

(10) Patent No.: US 12,643,155 B2
(45) Date of Patent: Jun. 2, 2026

(54) TOOL HEAD IN HEAD REPLACEABLE CUTTING TOOL

(71) Applicant: TUNGALOY CORPORATION, Fukushima (JP)

(72) Inventor: Yusuke Suzuki, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 526 days.

(21) Appl. No.: 18/054,200

(22) Filed: Nov. 10, 2022

(65) Prior Publication Data

US 2023/0219145 A1    Jul. 13, 2023

(30) Foreign Application Priority Data

Jan. 12, 2022    (JP) ................................. 2022-002933

(51) Int. Cl.
*B23B 27/16*        (2006.01)
*B23B 29/00*        (2006.01)
*B23B 31/00*        (2006.01)

(52) U.S. Cl.
CPC ............ *B23B 27/16* (2013.01); *B23B 31/005* (2013.01); *B23B 2231/0204* (2013.01)

(58) Field of Classification Search
CPC ... B23B 29/046; B23B 27/16; B23B 31/1075; B23B 31/005; B23B 2231/0204; B23B 2231/0256; B23B 27/00; B23B 27/14
See application file for complete search history.

(56) References Cited

U.S. PATENT DOCUMENTS

| | | | | |
|---|---|---|---|---|
| 3,545,318 | A | * | 12/1970 | Anderson ............. B23B 29/046 |
| | | | | 82/158 |
| 3,662,444 | A | * | 5/1972 | Erkfritz ................. B23C 5/2208 |
| | | | | 407/41 |
| 3,741,049 | A | * | 6/1973 | Anderson ............... B23B 29/06 |
| | | | | 407/11 |
| 3,827,119 | A | * | 8/1974 | Bennett ................. B23C 5/2479 |
| | | | | 407/45 |
| 4,033,018 | A | * | 7/1977 | Bloink .................. B23C 5/2269 |
| | | | | 407/49 |
| 6,312,199 | B1 | * | 11/2001 | Sjoden .................... B23B 27/10 |
| | | | | 407/4 |

(Continued)

FOREIGN PATENT DOCUMENTS

| | | |
|---|---|---|
| CN | 109692978 A | 4/2019 |
| CN | 110899740 A | 3/2020 |

(Continued)

*Primary Examiner* — Sara Addisu
(74) *Attorney, Agent, or Firm* — Studebaker Brackett PLLC

(57) ABSTRACT

Provided is a tool head in a head replaceable cutting tool configured on the basis of a novel idea so as to allow external measurement to be easily performed, while allowing cutting performance to be maintained. The tool head in the head replaceable cutting tool has a substantially cylindrical shape, and can be fastened to a shank held on a machine tool, and moreover includes an insert mounting seat on which a cutting insert is to be detachably mounted, the tool head further including a point, a line, or a surface that defines a reference surface from which a cutting edge of the cutting insert has a predetermined length to a predetermined portion thereof.

10 Claims, 6 Drawing Sheets

(56)                    References Cited

U.S. PATENT DOCUMENTS

| | | | |
|---|---|---|---|
| 6,409,435 B1 * | 6/2002 | Kocherovsky | B23B 27/045 |
| | | | 407/112 |
| 6,443,672 B1 * | 9/2002 | Lagerberg | B23B 27/10 |
| | | | 407/11 |
| 2003/0091400 A1 * | 5/2003 | Turcot | B27G 13/12 |
| | | | 407/62 |
| 2010/0254774 A1 | 10/2010 | Hecht | |
| 2013/0034393 A1 | 2/2013 | Hecht | |
| 2016/0368060 A1 * | 12/2016 | Ishihara | B23B 27/16 |
| 2019/0118274 A1 * | 4/2019 | Kawasaki | B23B 29/046 |
| 2020/0198020 A1 | 6/2020 | Moerk et al. | |
| 2020/0254530 A1 | 8/2020 | Flottorp et al. | |
| 2022/0016717 A1 * | 1/2022 | Hecht | B23B 29/043 |
| 2024/0278329 A1 * | 8/2024 | Suzuki | B23B 27/04 |

FOREIGN PATENT DOCUMENTS

| | | | | |
|---|---|---|---|---|
| JP | H11-320220 A | 11/1999 | | |
| JP | 2004-202632 A | 7/2004 | | |
| JP | 3158166 U | 3/2010 | | |
| JP | 2012-522651 A | 9/2012 | | |
| JP | 2014-524357 A | 9/2014 | | |
| JP | 2020-533188 A | 11/2020 | | |
| WO | WO-03041924 A1 * | 5/2003 | | B27G 13/10 |

* cited by examiner

*FIG. 6*

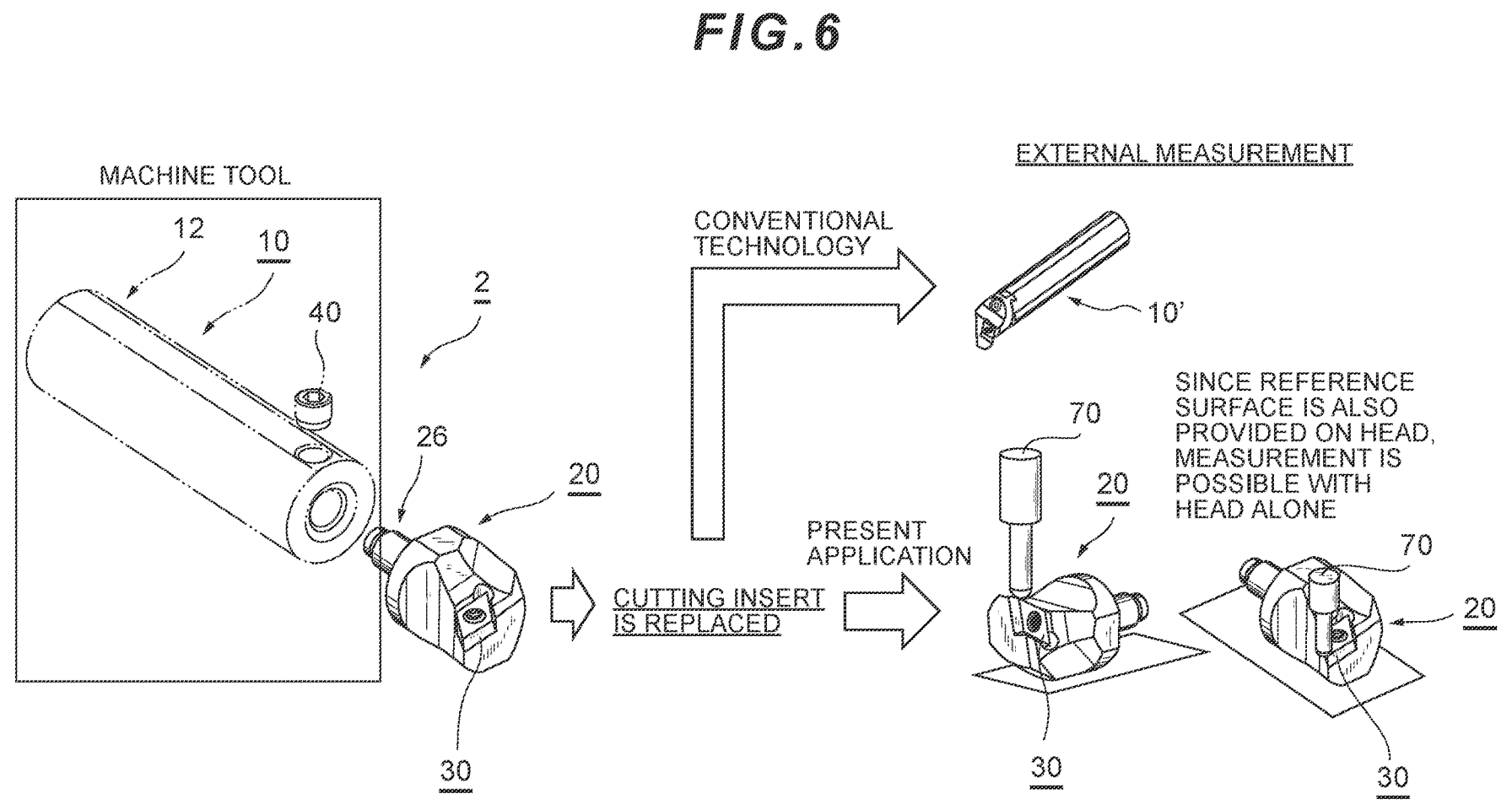

EXTERNAL MEASUREMENT

CONVENTIONAL TECHNOLOGY

SINCE REFERENCE SURFACE IS ALSO PROVIDED ON HEAD, MEASUREMENT IS POSSIBLE WITH HEAD ALONE

PRESENT APPLICATION

CUTTING INSERT IS REPLACED

MACHINE TOOL

TOOL HEAD IN HEAD REPLACEABLE CUTTING TOOL

BACKGROUND

Field

The present invention relates to a tool head in a head replaceable cutting tool.

Description of Related Art

In a cutting tool to be mounted on a machine tool for lathe machining (machining using a machine tool such as a lathe), a substantially cylindrical shank (referred to also as a "round shank" in the present specification) may be used. Such a round shank is provided with a planar surface (reference surface) having a shape formed by partially cutting out a peripheral surface thereof and, by pressing the planar surface (reference surface) with, e.g., a screw or the like when the cutting tool is mounted on the machine tool, an orientation of the shank in a peripheral direction (rotating direction) thereof is determined. When machining such as boring, external turning, or end surface turning is to be actually performed by using such a round shank, it is necessary to make preparations for machining (referred to also as setup). The "setup" mentioned herein generally includes operations such as: (1) mounting of a round-shank-type cutting tool on a machine tool; and (2) measurement of a cutting edge tip position performed in this state, and machining can be performed only after these sequential setup operations are ended. As a result, in a real situation, when such setup takes a longer time, a time period during which the machine tool cannot operate (referred to also as a "downtime") accordingly lengthens thereby degrading efficiency of production processing.

As one of methods for allowing a reduction in the downtime described above, a method using a head replaceable cutting tool has been proposed. This uses a head replaceable cutting tool (see, e.g., Japanese Translation of PCT Application No. JP2012-522651A and Japanese Translation of PCT Application No. JP2014-524357A) configured such that a tool head having an insert (chip) holding portion and a shank having a held portion to be held on the machine tool are provided as separate members, and the tool head can be detached in a state where the shank is held on the machine tool to increase operations that can externally be performed during the setup and thereby achieve a downtime reduction. The operations are carried out in a flow in which, e.g., (1') the tool head is detached from the shank in a state where the shank is mounted on the machine tool, the cutting edge tip position is externally measured (referred to as "external measurement), and (2') the tool head is attached to the shank. A time reduction in such a method may actually be achieved from a viewpoint of simplifying the attachment and, from this viewpoint, a mechanism for easily and precisely fastening the tool head to the shank has conventionally been proposed. With such a mechanism, it is possible to reduce the downtime by splitting the cutting tool (i.e., detaching the tool head from the shank), performing the external measurement, and then easily attaching the tool head to the shank.

SUMMARY

While the conventional technology for splitting the tool to allow the external measurement by using the mechanism for easily and precisely fastening the tool head to the shank has conventionally been proposed as described above, an approach or a technology based on the viewpoint of easily performing the external measurement has not been proposed. In particular, there is no approach or technology based on a viewpoint of causing the tool head to maintain cutting performance or causing the tool head to perform equivalently, while allowing easy external measurement.

To allow the external measurement to be easily performed while allowing the cutting performance to be maintained, an object of the present invention is to provide a tool head in a head replaceable cutting tool configured on the basis of a novel idea.

An aspect of the present invention is a tool head in a head replaceable cutting tool, the tool head having a substantially cylindrical shape and fastenable to a shank held on a machine tool, and including: an insert mounting seat on which a cutting insert is detachably mounted, the tool head further including a point, a line, or a surface that defines a reference surface from which a cutting edge of the cutting insert has a predetermined length to a predetermined portion thereof.

It can also be said that, in other words, improvements have previously been made under the assumption that the cutting tool has the reference surface provided on the shank but, by contrast, the tool head according to the present disclosure has been conceived on the basis of a novel idea of providing the reference surface, which has been provided only on the substantially cylindrical shank, on a head side. The tool head having such a novel configuration allows external measurement to be performed with the head alone. The ability to perform the external measurement with the head alone means that there is no need to externally prepare another such shank including the reference surface as used previously.

In forming the reference surface on the tool head, it can be considered to partially cut an outer periphery of the tool head to provide a flat surface. In the tool head according to the present disclosure having a configuration as described above, even when the partial cutting is thus performed, the effect exerted on cutting performance is small. In other words, in a previous structure in which, e.g., the reference surface is formed by partially cutting a peripheral surface of a shank having a substantially cylindrical shape (round shank), the partial cutting exerts significant effects on rigidity, warping, and the like of the shank. By contrast, in a structure as in the present disclosure in which the tool head is fastened to a shank leading end via a fastening mechanism, the effects are relatively small.

In the tool head according to an aspect as described above, at an outer peripheral portion of the shank, a shank reference surface having a shape formed by partially cutting out the outer peripheral portion is formed, and the reference surface of the tool head may also be formed horizontally or perpendicularly relative to the shank reference surface.

In the tool head according to an aspect as described above, the reference surface may also be formed at a portion of the tool head, the portion corresponding to a back side of the insert mounting seat.

In the tool head according to an aspect as described above, the reference surface may also be formed at a portion opposite to the predetermined portion of the cutting edge with respect to a center axis of the tool head.

In the tool head according to an aspect as described above, as the reference surface, a first reference surface formed at a portion of the tool head, the portion corresponding to a back side of the insert mounting seat, and a second reference surface formed at a portion of the tool head opposite to the predetermined portion of the cutting edge with respect to a center axis of the tool head may also be formed.

In the tool head according to an aspect as described above, at a portion opposite to the first reference surface across the center axis, a third reference surface parallel to the first reference surface may also be formed.

In the tool head according to an aspect as described above, the predetermined portion may also be an edge tip of the cutting edge.

The tool head according to an aspect as described above further includes: a fastening mechanism for fastening the tool head to the shank, and the fastening mechanism may also have a size such that, when viewed from a leading end side provided with the insert seat along the center axis of the tool head, the fastening mechanism is not located outside the reference surface.

In the tool head according to an aspect as described above, the reference surface may also be formed of a planar surface.

In the tool head according to an aspect as described above, the reference surface may also be formed such that the tool head is self-standing on a flat mounting surface.

BRIEF DESCRIPTION OF DRAWINGS

FIG. 6 is a diagram illustrating a sequential flow after the tool head is detached from the shank until edge tip position measurement is performed with the tool head alone.

DETAILED DESCRIPTION

Figure 1:
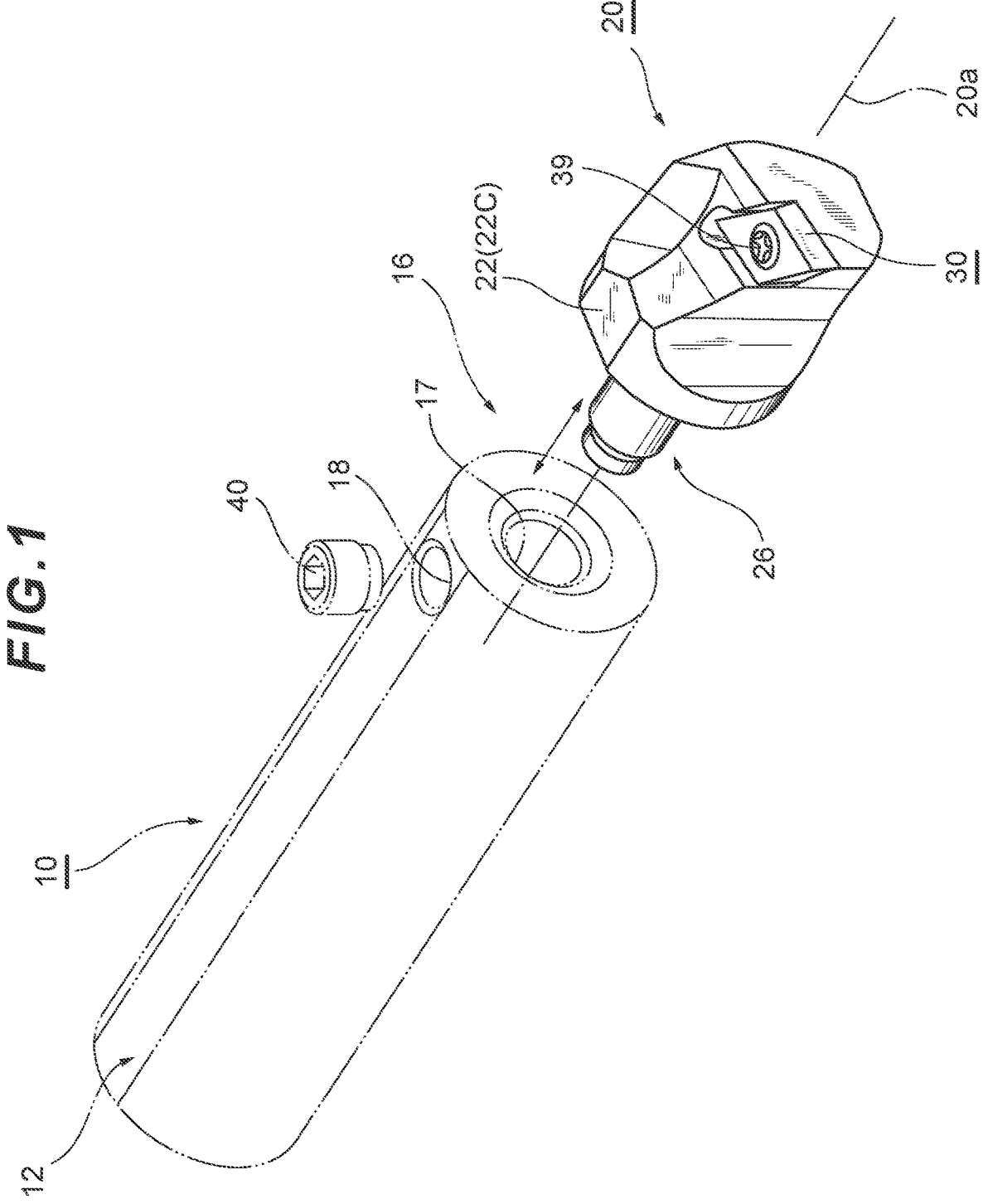
FIG. 1 is a diagram illustrating an example of a shank and a tool head in a head replaceable cutting tool.

Referring to the drawings, a detailed description will be given below of a preferred embodiment of a tool head according to the present invention (see FIG. 1 or the like). A tool head 20 can be fastened to a shank 10 of a cutting tool to be mounted on a machine tool (illustration thereof is omitted), and has a reference surface 22 formed on a predetermined portion thereof.

The machine tool is a cutting device to be used when machining such as boring, external turning, or end surface turning is performed on a workpiece. On the machine tool in the present embodiment, a head replaceable cutting tool 2 including the shank 10, the tool head 20, a cutting insert 30, and the like is mounted (see FIG. 1, 6, or the like).

The shank 10 includes a shank reference surface 12, a fastening mechanism 16, a screw hole 18, and the like. The shank 10 in the present embodiment has a substantially cylindrical shape, and is therefore the shank 10 referred to as a round shank type (see FIG. 1 or the like). The shank reference surface 12 is formed of a flat surface formed by partially cutting out a peripheral surface of the shank 10 (see FIG. 1 or the like). The shank reference surface 12 functions as a surface serving as a reference for positioning when the shank 10 of the head replaceable cutting tool 2 is mounted on the machine tool. A leading end portion of the shank 10 is provided with the fastening mechanism 16 for fastening the tool head 20 (see FIG. 1 or the like). The fastening mechanism 16 includes a fastening hole 17, the screw hole 18, a fastening screw 40, and the like. The fastening hole 17 is provided as a hole from which a fastening mechanism 26 of the tool head 20 is detachable in the leading end of the shank 10. The screw hole 18 is provided as a hole into which the fastening screw 40 is to be screwed in the peripheral surface of the shank 10. The screw hole 18 may also be provided in the shank reference surface 12 described above (see FIG. 1 or the like).

The tool head 20 is a member that holds the cutting insert 30 and can also be fastened to the shank 10. The tool head 20 in the present embodiment is provided to be detachable from the shank 10 in a state where a center axis 20a thereof is coincident with a center axis of the shank 10. The tool head 20 includes an insert mounting seat 21, a reference surface 22, a fastening mechanism 26, and the like, and is formed in a substantially cylindrical shape on the whole (see FIG. 1 or the like).

Figure 3A:
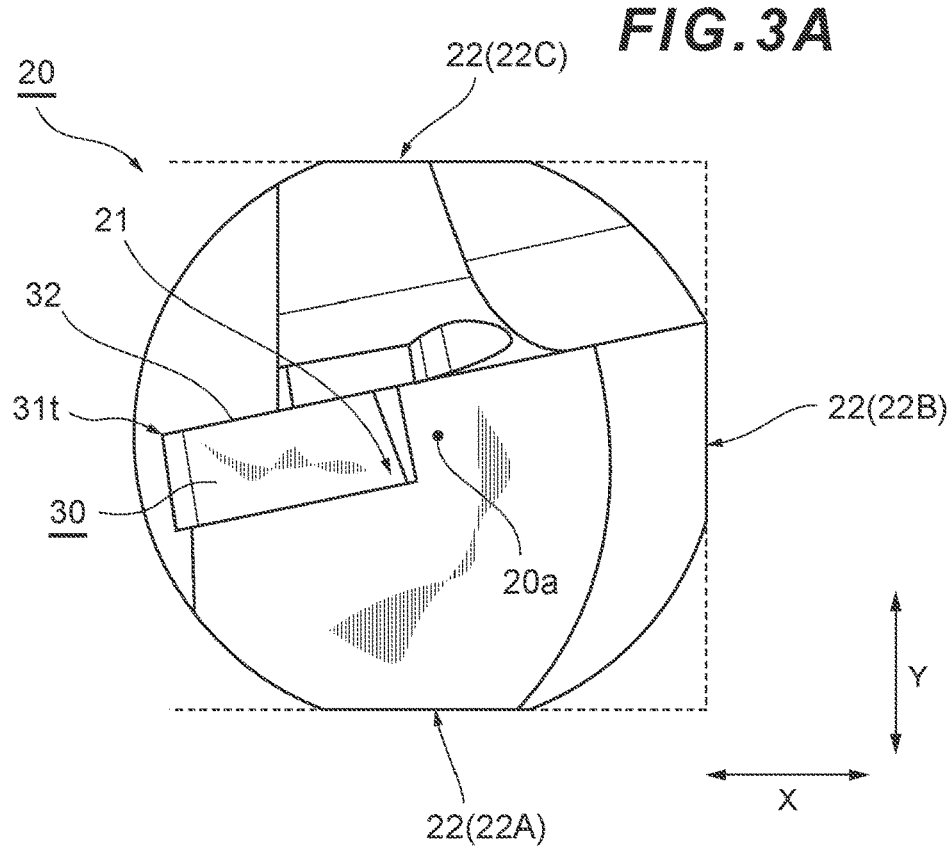
FIG. 3A is a diagram illustrating the tool head in the embodiment of the present invention when viewed from a leading end side along a center axis.

The insert mounting seat 21 is formed to detachably mount the cutting insert 30 (see FIG. 3A or the like). The cutting insert 30 is mounted on the insert mounting seat 21 by using an insert fixing screw 39 in a state where a rake surface 32 faces a predetermined direction (see FIG. 1, 3A, or the like).

Figure 4:
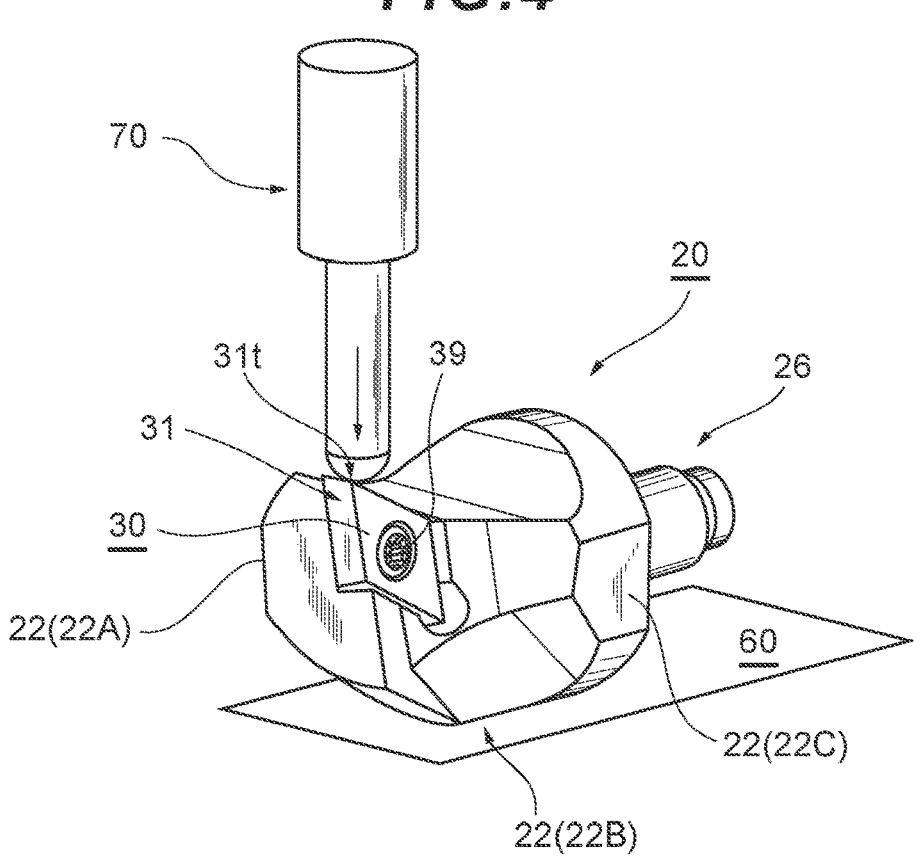
FIG. 4 is a perspective view illustrating position measurement performed along a width direction of the tool head from a reference surface in the width direction to an edge tip of a cutting edge.

The cutting insert 30 performs various cutting processes such as boring on the workpiece. The cutting insert 30 in the present embodiment has a cutting edge 31 including a major cutting edge and a corner cutting edge and formed along an intersecting edge (ridge portion) 36 between a peripheral side surface 35 and an upper surface 37 (see FIG. 4 or the like). The corner cutting edge is formed at a corner portion 38, while the major cutting edge is formed to be continued to the corner cutting edge (see FIG. 2B, 4, or the like).

The reference surface 22 is formed as a portion serving as a reference when a length of the cutting edge 31 of the cutting insert 30 attached to the insert mounting seat 21 of the tool head 20 to a predetermined portion thereof is to be measured. The reference surface 22 as described above allows various predetermined dimensions from the reference surface 22 to an edge tip 31t of the cutting edge 31 to be measured in a state where the tool head 20 is detached from the shank 10 (state where the tool head is alone) (see FIG. 4, 5, or the like). A specific position of the edge tip 31t of the cutting edge 31 mentioned herein may vary depending on a measurement target or a mode. This will be described later in detail.

Figure 3B:
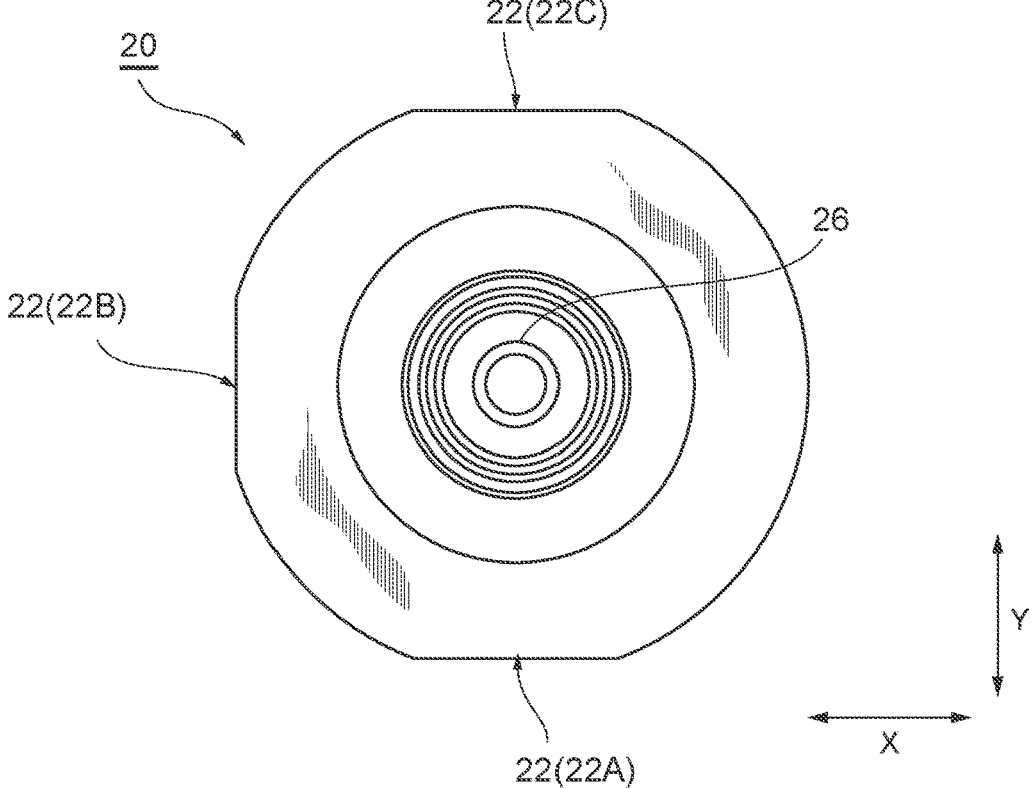
FIG. 3B is a diagram illustrating the tool head in the embodiment of the present invention when viewed from a base end side along the center axis.

It may be possible that the one reference surface 22 as described above is formed on the tool head 20 or a plurality of the reference surfaces 22 are formed thereon. In either case, the reference surface 22 of the tool head 20 is preferably formed horizontally or perpendicularly to the shank reference surface 12 described above. The tool head 20 in the present embodiment is formed with three reference surfaces, i.e., a first reference surface 22A, a second reference surface 22B, and a third reference surface 22C, which will be described below. The tool head 20 has a substantially cylindrical shape having three linear portions in contour lines when viewed from a leading end (or a base end) along the center axis 20a such that both ends of these linear portions are connected to arcs in the contour lines (see FIG. 3A, 3B, or the like).

Figure 5:
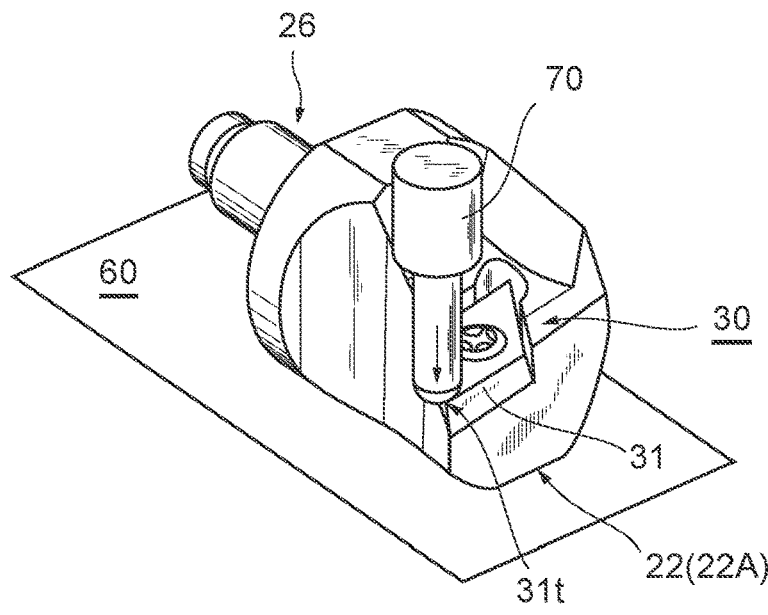
FIG. 5 is a perspective view illustrating position measurement performed along a height direction of the tool head from a reference surface in the height direction to the edge tip of the cutting edge.

The first reference surface 22A is the reference surface formed at a portion of the tool head 20 which corresponds to a back side of the insert mounting seat 21 (see FIG. 3A or the like). The first reference surface 22A is formed so as to be horizontal to the shank reference surface 12 in a state where the tool head 20 is attached to the shank 10. Note that, in the present specification, a direction (vertical direction in FIGS. 3A and 3B) perpendicular to the first reference surface 22A is conveniently referred to as a "height direction" and denoted by a reference sign Y, while a direction (lateral direction in FIGS. 3A and 3B) parallel to the first reference surface 22A is conveniently referred to as a "width direction" and denoted by a reference sign X. The first reference surface 22A as described above enables a length (height) of the cutting edge 31 of the cutting insert 30 to a predetermined portion thereof (e.g., the edge tip 31t) in the height direction Y described above (which is slightly inclined with respect to a direction of view toward the rake surface 32 of the cutting insert 30) to be measured. Specifically, on a flat surface 60, the tool head 20 is placed with the first reference surface 22A facing downward, and a dial gauge (height gauge) 70 is applied to a predetermined portion (e.g., the edge tip 31t) from above to allow a length (height) from the first reference surface 22A to the predetermined portion (which is the edge tip 31t in the case of the present embodiment) to be measured (see FIG. 5).

To the predetermined portion mentioned herein, the edge tip 31t of the cutting edge 31 (more specifically, an edge tip of the corner cutting edge at the corner portion 38 of the cutting edge 31) typically corresponds, but this is only an example of the predetermined portion of the cutting edge 31. Another portion of the cutting edge 31 may serve as a measurement portion.

The second reference surface 22B is formed at a portion to which a virtual line connecting the predetermined portion (e.g., the edge tip 31t) of the cutting edge 31 of the cutting insert 30 and the center axis 20a of the tool head 20 is extended with respect to the center axis 20a, i.e., on a side opposite to each of the cutting insert 30 and the insert mounting seat 21 in the width direction X (see FIG. 3A). The second reference surface 22B is formed perpendicularly to the shank reference surface 12 and the first reference surface 22A. The second reference surface 22B as described above allows a length of the cutting edge 31 of the cutting insert 30 to a predetermined portion (e.g., the edge tip 31t) thereof in the width direction X to be measured. Specifically, on the flat surface 60, the tool head 20 is placed with the second reference surface 22B facing downward, and the dial gauge (height gauge) 70 is applied to a predetermined portion (e.g., the edge tip 31t) from above to allow a length from the second reference surface 22B to the predetermined portion (which is the edge tip 31t in the case of the present embodiment) along the width direction X to be measured (see FIG. 4).

Figure 2A:
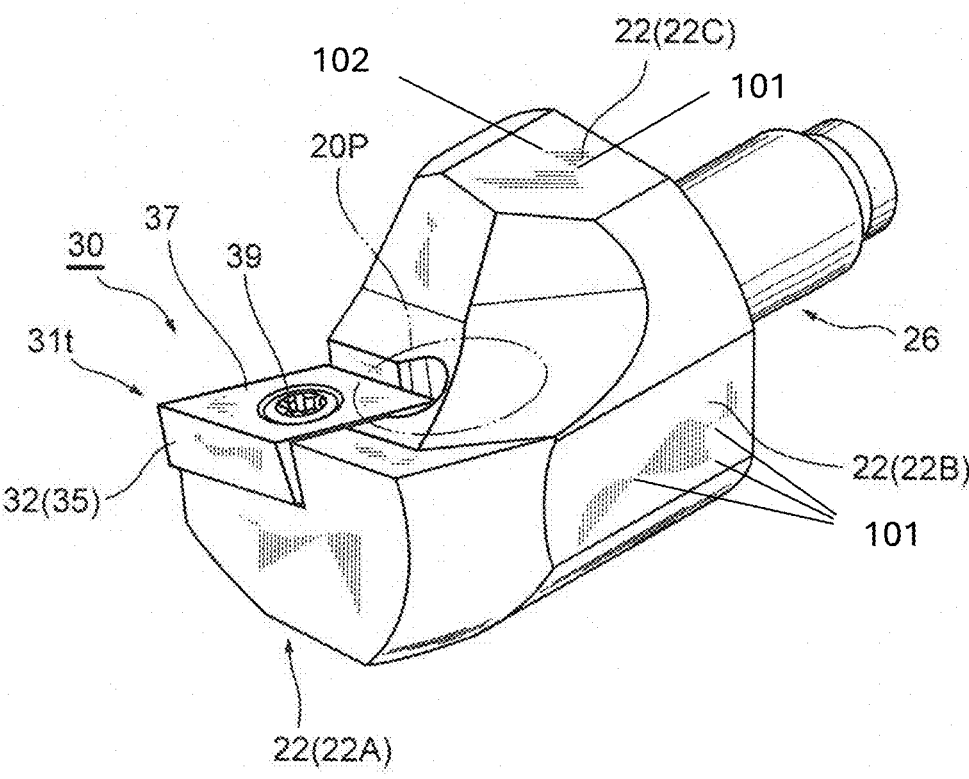
FIG. 2A is a perspective view of a tool head in an embodiment of the present invention.
Figure 2B:
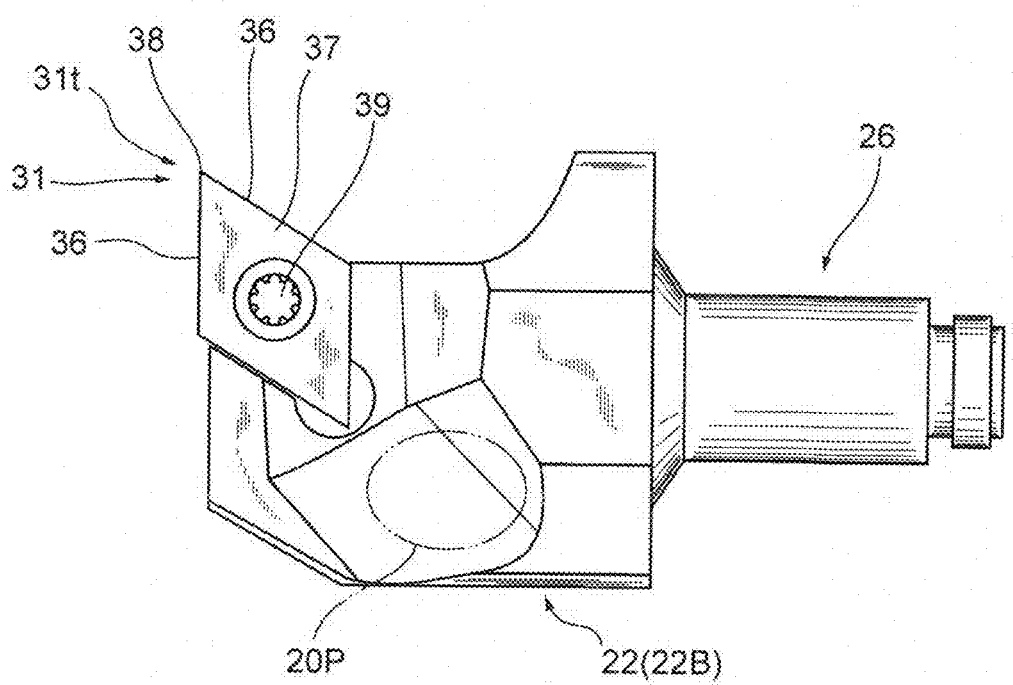
FIG. 2B is a plan view of the tool head in the embodiment of the present invention (when viewed from a third reference surface)

The third reference surface 22C is formed at a portion opposite to the first reference surface 22A with respect to the center axis 20a interposed therebetween (see FIG. 2A or the like). The third reference surface 22C as described above is formed in parallel to each of the first reference surface 22A and the shank reference surface 12 (see FIG. 3A or the like).

The third reference surface 22C as described above can be used as, e.g., a zero-point adjustment surface for the dial gauge 70. In other words, the third reference surface 22C can be used such that, at the time of measurement of the length (height) from the first reference surface 22A described above to the predetermined portion (which is the edge tip 31t in the present embodiment) using the dial gauge 70 or the like, zero-point adjustment for the dial gauge 70 is made in advance by using the third reference surface 22C. Alternatively, in such a case where an edge tip position before the use of the cutting insert 30 and an edge tip position after the use thereof are to be compared to each other, the third reference surface 22C can be used as a reference surface which remains unchanged before and after the use thereof.

Figure 2C:
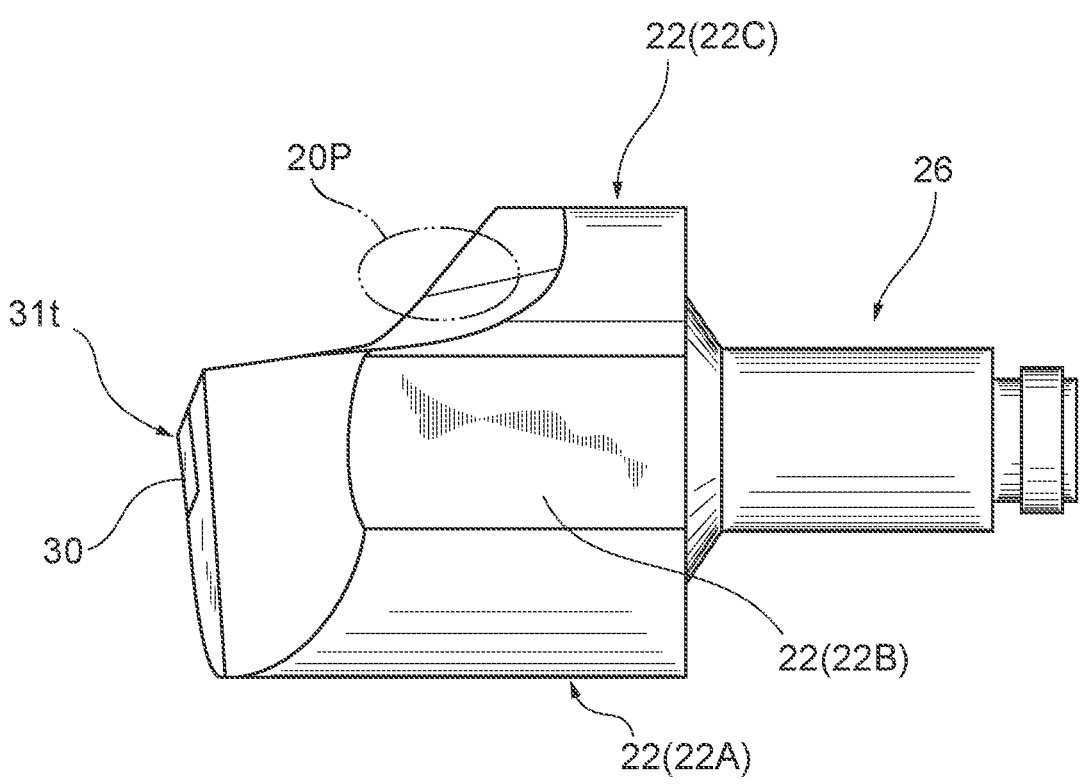
FIG. 2C is a side view of the tool head in the embodiment of the present invention (when viewed from the second reference surface)

The fastening mechanism 26 is configured of a mechanism for fastening the tool head 20 to the fastening mechanism 16 of the shank 10. The fastening mechanism 26 in the present embodiment has the same structure as used previously, such as a stepped cylindrical projection detachable from the fastening hole 17 of the shank 10 (see FIG. 2A or the like). This fastening mechanism 26 has a size such that, when viewed from the leading end side provided with the insert seat along the center axis 20a of the tool head 20, the fastening mechanism 26 is not located outside the reference surface 22 (the first reference surface 22A, the second reference surface 22B, and the third reference surface 22C), i.e., a size which allows the fastening mechanism 26 to fit within the contours of the tool head 20 (see FIG. 2C, 3B, or the like). Accordingly, there is no such case that, when the tool head 20 is placed on the flat surface 60 with the first reference surface 22A or the second reference surface 22B facing downward, the fastening mechanism 26 abuts on the flat surface 60 to result in difficult measurement (see FIG. 4, 5, or the like).

As described above, the tool head 20 including the reference surface 22 including the first reference surface 22A, the second reference surface 22B, and/or the third reference surface 22C allows external measurement to be performed with the head alone. In other words, in a case where the tool head particularly for a boring tool or an external turning tool usable for boring has a substantially cylindrical shape, it has been difficult heretofore to perform external measurement of the edge tip position only with the tool head. Accordingly, under the assumption that the reference surface is provided on the shank 10, there is no other way but to measure the position of the cutting edge in a state where the tool head 20 is attached to another shank 10'. By contrast, in the tool head 20 according to the present embodiment, the reference surface that has been provided only on the shank is provided on the head to allow a change in the edge tip position occurring at the replacement of the cutting insert 30 to be externally measured with the head alone (see FIG. 6). As a result, the tool head 20 as in the present embodiment eliminates the need to attach the tool head 20 to the other shank 10' at each external measurement accompanying the replacement of the cutting insert 30 and, in the first place, the other shank 10' for the external measurement is unnecessary.

Additionally, in forming the reference surface 22 as described above on the tool head 20, the tool head 20 having a configuration as described above can minimize effects exerted on cutting performance. In other words, in the previous structure in which the reference surface is formed by, e.g., partially cutting a peripheral surface of a round shank, there are significant effects exerted by a volume reduction in the round shank resulting from the partial cutting on rigidity, warping, and the like of the shank and on the cutting performance. By contrast, in a structure as in the present embodiment in which the tool head 20 is fastened into the fastening hole 17 in the leading end of the shank 10 via the fastening mechanisms 16 and 26, even when the reference surface 22 is formed by partially cutting the tool head 20, the effects exerted on the rigidity of the fastening mechanisms 16 and 26 are extremely small, and consequently the resulting rigidity reduction in an entire assembly or the resulting effects exerted on the cutting performance are minimized. In other words, in a case of an integral type, a cross-sectional area or the like is directly involved in the rigidity but, in a case of a head replacement type, the rigidity is substantially determined by the fastening mechanism 26 of the tool head 20. Even when the cross-sectional area of the tool head 20 is increased more than necessary, the rigidity of the fastening mechanism is by no means exceeded. Conversely, as long as the rigidity of the fastening mechanism 26 is not degraded, even when the cross-sectional area of the tool head 20 is reduced, the resulting effects are extremely small. In the present embodiment, by utilizing such a structural characteristic, it is possible to further cut down a portion (denoted by a reference sign 20P in FIG. 2A or the like) referred to as a so-called pocket around the insert mounting seat 21 in terms of improving chip dischargibility or reducing a weight and provide a deeper shape.

Note that, in the present embodiment, the description has been given of the first reference surface 22A, the second reference surface 22B, and the third reference surface 22C each formed of a flat surface formed through partial flattening and illustrated in the drawings, but these are only preferred examples of the reference surface 22. Besides this, the reference surface 22 can also be formed of, e.g., a curved surface or the like. The point is that three contact points 101 that uniquely define an attitude (such as a position or an inclination) of the tool head 20 may appropriately be included in the reference surface 22 (see FIG. 2A). As long as such three contact points are included, the predetermined reference surface 22 may be defined by one contact point 101 and one tangential line 102 and, for example, the reference surface 22 may be defined using edges on both sides of a recessed surface having a warped recessed shape.

Also, in the present embodiment, the first reference surface 22A, the second reference surface 22B, and the third reference surface 22C are formed at such positions and in such shapes and sizes as to allow the tool head 20 to be self-standing on the flat surface 60 (see FIG. 3A or the like), but these are also only preferred examples of the reference surface 22. For example, even when the tool head 20 is placed on the flat surface 60 with the reference surface 22, which is not self-standing, facing downward, it is possible to perform an external measurement operation while fixing the tool head 20 with a fixing jig or manually holding the tool head 20, but this only takes work such as manual holding. Incidentally, whether or not the tool head 20 is self-standing is determined by whether or not the moments of forces required according to a shape (particularly cross-sectional shape) of the tool head 20, a position of a gravity center in the shape, a position, a length, and the like of the reference surface 22 with respect to the gravity are balanced.

Note that the embodiment described above is an example of preferred implementation of the present invention, but is not limited thereto. Various modifications can be made within the scope not departing from the gist of the present invention. For example, in the embodiment described above, the description has been given of the edge tip 31*t* of the cutting edge 31 as an example of the length of the cutting edge 31 to the predetermined portion thereof as a target when the external measurement is to be performed, but this is only an example. In other words, to the predetermined portion mentioned herein, the edge tip (more specifically, the edge tip of the corner cutting edge at the corner portion 38 of the cutting edge 31) 31*t* of the cutting edge 31 corresponds, but this is only an example of the predetermined portion of the cutting edge 31. Another portion of the cutting edge 31 may be the measurement portion, and therefore, by way of example, the measurement portion may be a leading end (corner portion 38) in plan view or a portion (the intersecting edge 36 between the rake surface 32 and a flank) of the cutting edge 31 which appears in any transverse section vertical to the center axis 20*a*.

The tool head 20 as described above is applicable to a milling tool having a cutting edge (e.g., a single cutting edge) in one direction or the like.

The present invention is applied appropriately to a tool head in a head replaceable cutting tool.

What is claimed is:

1. A tool head in a head replaceable cutting tool, the tool head having an outer periphery that has a substantially cylindrical shape with an outward convex surface when viewed from a leading end along a center axis and fastenable to a shank held on a machine tool, and comprising an insert mounting seat on which a cutting insert is detachably mounted, the tool head further comprising at least one point, at least one line, a point and a line, or a surface on the outer periphery of the tool head in a direction perpendicular to the center axis that defines a reference surface from which a cutting edge of the cutting insert has a predetermined length to a predetermined portion thereof.

2. The tool head according to claim 1, wherein, at an outer peripheral portion of the shank, a shank reference surface having a shape formed by partially cutting out the outer peripheral portion is formed, and the reference surface of the tool head is formed horizontally or perpendicularly relative to the shank reference surface.

3. The tool head according to claim 1, wherein the reference surface is formed at a portion of the tool head, the portion corresponding to a back side of the insert mounting seat.

4. The tool head according to claim 1, wherein the reference surface is formed at a portion opposite to the predetermined portion of the cutting edge with respect to a center axis of the tool head.

5. The tool head according to claim 1, wherein, as the reference surface, a first reference surface formed at a portion of the tool head, the portion corresponding to a back side of the insert mounting seat, and a second reference surface formed at a portion of the tool head opposite to the predetermined portion of the cutting edge with respect to a center axis of the tool head are formed.

6. The tool head according to claim 5, wherein, at a portion opposite to the first reference surface across the center axis, a third reference surface parallel to the first reference surface is formed.

7. The tool head according to claim 1, wherein the predetermined portion is an edge tip of the cutting edge.

8. The tool head according to claim 1, further comprising a fastening mechanism for fastening the tool head to the shank, wherein the fastening mechanism has a size such that, when viewed from a leading end side provided with the insert seat along the center axis of the tool head, the fastening mechanism is not located outside the reference surface.

9. The tool head according to claim 1, wherein the reference surface is formed of a planar surface.

10. The tool head according to claim 1, wherein the reference surface is formed such that the tool head is self-standing on a flat mounting surface.

* * * * *